United States Patent [19]
Friedlander

[11] 3,867,926
[45] Feb. 25, 1975

[54] BLOOD PRESSURE MEASURING DEVICE UTILIZING SUB-AUDIBLE FREQUENCY FOR DETECTION

[75] Inventor: Sidney Lee Friedlander, Tarzana, Calif.

[73] Assignee: Sphygmetrics, Inc., Woodland Hills, Calif.

[22] Filed: Oct. 24, 1972

[21] Appl. No.: 300,077

[52] U.S. Cl. .......................... 128/2.05, 128/2.05 Q
[51] Int. Cl. ............................................. A61b 5/02
[58] Field of Search .... 128/2.05 A, 2.05 G, 2.05 M, 128/2.05 P, 2.05 Q, 2.05 R, 2.05 S

[56] References Cited
UNITED STATES PATENTS

| | | | |
|---|---|---|---|
| 1,934,124 | 11/1933 | Hubbard | 128/2.05 Q |
| 2,073,457 | 3/1937 | Schwartzschild | 128/2.05 S |
| 3,085,567 | 4/1963 | Vigilante | 128/2.05 A |
| 3,308,811 | 3/1967 | Gillette et al. | 128/2.05 M |
| 3,633,568 | 1/1972 | Hobel | 128/2.05 M |
| 3,651,798 | 3/1972 | Egli et al. | 128/2.05 P |

FOREIGN PATENTS OR APPLICATIONS

| | | | |
|---|---|---|---|
| 921,396 | 3/1963 | Great Britain | 128/2.05 S |

OTHER PUBLICATIONS
Schulze et al., "Southwest Institute of Electrical & Electronics Engineering Conference Record, Apr. 1968, pp. 17F1–17F5.

*Primary Examiner*—William E. Kamm
*Attorney, Agent, or Firm*—Jackson & Jones

[57] ABSTRACT

A detecting system for indirectly measuring arterial blood pressure utilizing an inflatable sleeve together with a sensing and recording device is disclosed. The system includes a composite filter adapted to block frequencies of approximately D.C. to 5 Hz, which frequencies are associated with a pulse of blood pumped through an artery past the sleeve as pressure in the sleeve is reduced thus allowing the blood pulse to appear at a sensing device. Sub-audible signals in a low frequency bandwidth of about five through 35 Hz are passed through the composite filter to a recording device. This low frequency pass band allows a fundamental sub-audible frequency to be employed as a means for accurately indicating blood pressure in a wide variety of subjects not heretofore susceptible to blood pressure measurements as taken by prior art devices.

6 Claims, 3 Drawing Figures

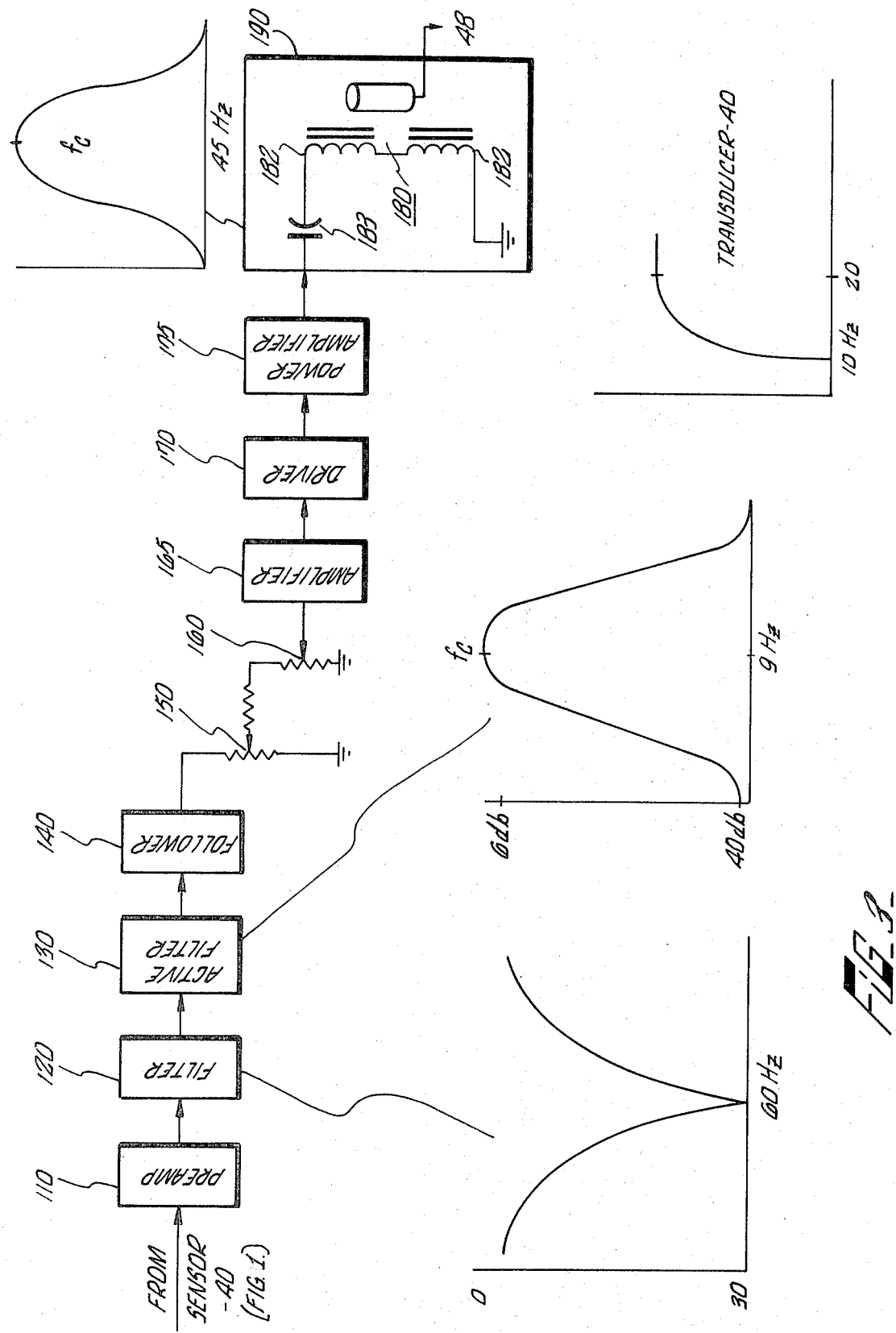

BLOOD PRESSURE MEASURING DEVICE UTILIZING SUB-AUDIBLE FREQUENCY FOR DETECTION

BACKGROUND OF THE INVENTION

1. Field of the Invention

This invention relates generally to medical diagnostic equipment and more particularly relates to indirect blood pressure measurement devices.

2. Description of the Prior Art

The most common method of measuring the blood pressure of a subject, whether a human being or an animal, involves the auscultatory method developed by Dr. N. S. Korotkoff. A thorough description of his technique along with comments on his original studies are described in pages 98–111 entitled "Direct and Indirect Measurement of Blood Pressure" authored by L. A. Geddes, M.D., and published by Yearbook Medical Publishers, Chicago, 1970.

The auscultatory method has become common place. It is familiar to all even though the scientific basis of that method is not fully appreciated by many. The auscultatory method and its associated devices will be described in considerable detail after a brief description of other indirect and direct blood pressure measurement devices of the prior art.

A direct blood pressure reading may be obtained by utilizing an incision in the subject's skin and into the artery so that a tiny transducer may be placed directly into the blood stream. This technique has numerous obvious disadvantages. It is totally unacceptable for small infants and is highly impractical for any mass testing situation.

An indirect method, other than auscultatory, which has been employed in the prior art utilizes an ultrasonic technique. Such equipment is extremely expensive. The extreme accuracy with which the ultrasonic transducer must be placed, is a critical shortcoming. Any small movement of the subject adversely affects the accuracy of reading taken with this ultrasonic technique.

Another prior art approach involves a double sleeve wherein a differential volume in the two sleeves is related to blood pressure measurements. This particular device is also extremely sensitive to movements by the subject being tested. It has not gained widespread acceptance.

In summary, all the foregoing devices of the prior art are expensive and require much skill by the person doing the testing. As a result, most pressure readings today are still made by using the auscultatory method that was first perfected in the early 1900's. In the auscultatory technique, a sleeve incorporating an inflatable bladder is generally placed around the middle one/third of the arm toward the shoulder. A sensor, usually a stethoscope or a microphone, is placed over the antecubital fossa or under the distal edge of the sleeve over the brachial artery. Means, such as a mercury manometer, are provided to measure the air pressure within the inflatable bladder. The sleeve bladder is inflated to a pressure 20–30 mmHg above the point which cuts off the circulation of blood beyond the sleeve. Thereafter pressure is released slowly at about 3–5 mmHg/second, until short tapping sounds coincidental with the heart beat are heard. These sounds are commonly known as Korotkoff sounds. The pressure at which the first of these sounds are heard, is taken to be the systolic or maximum arterial blood pressure. As the pressure continues to fall in the sleeve, the tapping sounds change in character usually passing through four distinct phases until they disappear entirely. At the fourth phase, the sounds become distinctly muffled and at the fifth phase they no longer can be heard. These last two phases usually occur quite close together in pressure. Either one or both are recorded as the diastolic or minimum arterial blood pressure.

Doctors or other specialists in obtaining blood pressure measurements are, of course, subject to human errors that are inherent in any subjective measurement based upon sound. Furthermore, it is known that blood pressure readings vary in accordance with the skill and alertness of the person making the determination. In this regard, it is common practice today to take the blood pressure of a large number of individuals, mass testing, because blood pressure readings are a significant diagnostic factor useful in separating normally healthy subjects from unhealthy subjects. For example, diabetics, people suffering with hypotension, hypertension or the like, can be readily detected by their blood pressure readings diverging dramatically from readings for healthy subjects. Using the auscultatory method it is difficult for even the most skilled doctor or technician to accurately test more than 30 or 40 subjects per day. After such a large number of subjects have been tested, the person doing the testing simply is not capable of accurately discerning the difference between the various Korotkoff sounds.

Another factor of considerable concern with respect to the auscultatory method of the prior art is that such methods are virtually useless in subjects experiencing abnormal physiological conditions. Thus, it is known that individuals in shock, very obese individuals, and individuals suffering with either hypotension or hypertension are extremely difficult individuals to obtain accurate blood pressure readings for. Unfortunately, these individuals are the ones for which highly accurate readings are critical. Newborn, small or very ill children also fit into this category.

In spite of these shortcomings, the Korotkoff technique, prior to this invention, has been regarded as the most commonly accepted and universally employed technique. Accordingly, most prior art devices with the advent of electronics have merely taken the form of electronic substitutes for the doctor's ear. In short, such prior art devices amplify the audible Korotkoff sounds and use a variety of recording means in attempts to record the systolic and diastolic pressures. In all such auscultatory prior art devices a common characteristic exists; namely, that they have a band pass for the detected signals which is in the audible frequency range of approximately 35–200 Hz. Further, more, such devices pick up harmonics (or Korotkoff sounds) rather than attempting to detect the sub-audible fundamental frequency which creates the harmonics.

SUMMARY OF THE INVENTION

The present invention comprises an indirect detecting system for measuring arterial blood pressure involving a sleeve bladder and a novel sensing and recording system. My invention obviates the above-mentioned disadvantages of the prior art indirect blood measuring devices in that they detect audible sounds resulting from arterial flow. I detect, instead, a fundamental frequency which creates the harmonics detected by the prior art. This fundamental frequency is present in a highly complex waveform and is truly representative of arterial flow. It exists at an extremely low frequency, and is separated by only a few cycles from a high energy low frequency wave indicative of a pumped blood pulse. Such a blood pulse has a dominant frequency range of approximately D.C. to five Hz. It is an extremely large signal in the order of several magnitudes greater than the fundamental frequency signal that I detect in my invention.

Every contributing circuit component in my system including the transducer, galvanometer coils, and various filters are taken into consideration in order to provide a composite filter of expressly desired characteristics. The composite filter of my system is characterized by a center frequency of approximately 17 Hz and an extremely sharp roll off on the low frequency side as defined by an infinite db point at approximately 4 to 5 Hz. My composite filter also has a narrow pass band which at the 3 to 6 db points passes approximately 10 to 30 Hz.

In my invention I have discovered that center frequencies other than 17 Hz may be employed with varying degrees of success. However, such center frequencies should be selected within a frequency range of 17 Hz ± 10 Hz. The output signal passed by my composite filter is utilized to drive an ordinary galvanometer including a stylus. The stylus is positioned on a circular recording disk having non-linear scales for recording various pressure readings between 20 and 300 mm of mercury. The positioning of the stylus on the disk is directly related to the maximum starting pressure in a sleeve, and the disk rotates underneath the stylus as pressure in the sleeve drops slowly. The resulting record on the disk shows (a) the maximum inflation pressure, (b) a first large radial marking at the systolic pressure, and (c) an extremely short radial marking which is the diastolic pressure.

DESCRIPTION OF THE DRAWINGS

FIG. 3 is a combined block and schematic diagram of the elements of FIG. 1.

BRIEF DESCRIPTION OF THE PREFERRED EMBODIMENT

Figure 1:
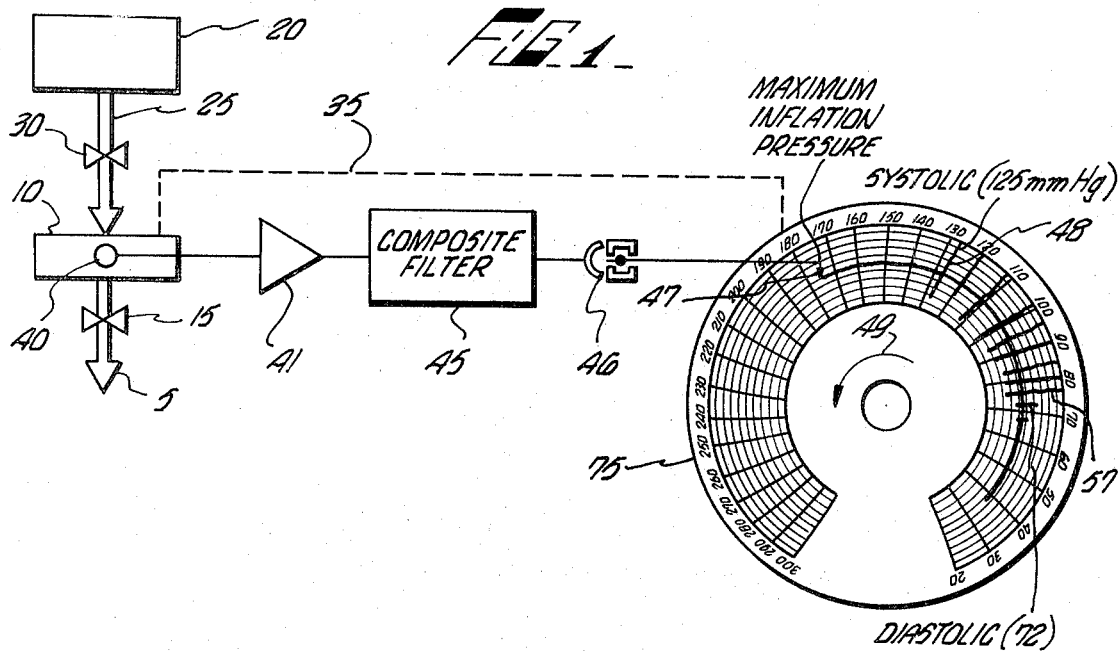
FIG. 1 is a combined block diagram, including a plan view of an automatic recording disk employed in my invention.

Turning now to FIG. 1, a sleeve 10 of any conventional type may be employed. Such sleeves are normally placed on the middle one/third of the arm toward the shoulder. Associated with the sleeve 10 is an air pump 20. Air pump 20 is coupled to sleeve 10 by an input conduit 25 which includes an inlet valve 30. Pump 20 and valve 30 may either be manually operated or they may be automatically controlled. Once the sleeve 10 has been placed around the bicep area of the arm of the subject to be tested, air under pressure from pump 20 is delivered by conduit 25 to sleeve 10 so as to fully inflate sleeve 10. As sleeve 10 inflates to a high pressure, normally in the order of 200 mmHg, or so (maximum inflation pressure) the artery in the arm is occluded. This occlusion of the artery momentarily stops circulation of the blood beyond the sleeve. Thereafter, a pressure bleed valve 15 is opened to slowly allow the air from sleeve 10 to escape through an outlet conduit 5.

The pressure in the sleeve drives a rotating recording disk 75 through any suitable aneroid manometer and gear arrangement as shown symbolically by dashed line 35. Various drives are available on the market for driving the recording disk 75 and any such suitable drive may be employed in my invention.

Positioned in sleeve 10 is a sensitive transducer, or sensor, 40. Transducer 40 detects disturbances caused by blood flow in the artery below the sleeve and converts such disturbances to an electrical signal. Connected to the output of transducer 40 is an amplifier and filter circuit 45 (shown in detail in FIG. 3) which amplifies and filters the electrical signals emitted by transducer 40. The signals from transducer 40 are filtered by a composite filter having particularly unique characteristics in accordance with my invention. The composite filter of my invention takes into consideration, all capacitive and inductive etc. portions of the system. These components together yield the composite filter characteristic of my invention as depicted in FIG. 2.

Figure 2:
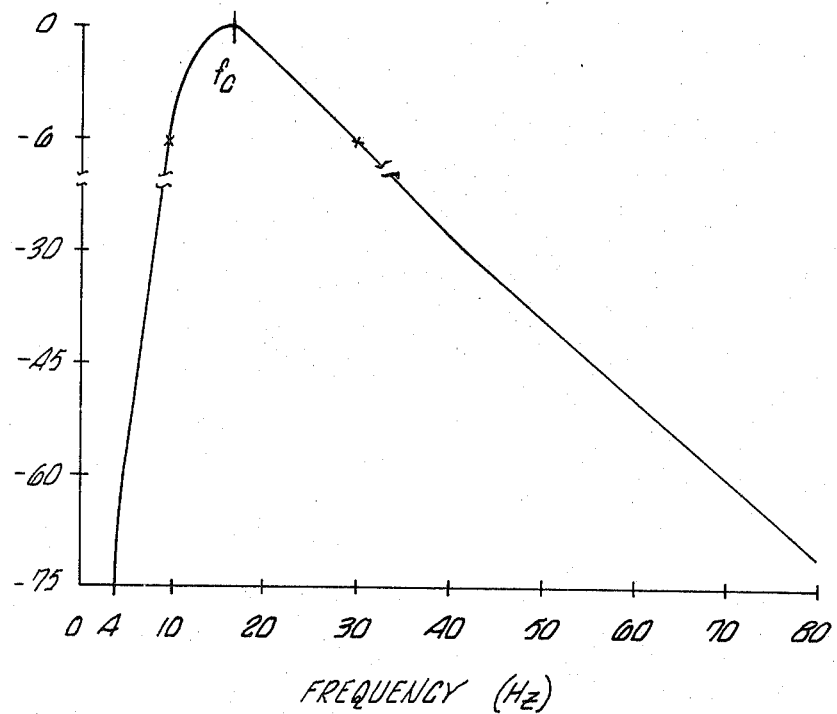
FIG. 2 is a frequency curve depicting a desired characteristic of the composite filter of my invention.

As is shown in FIG. 2, the filter characteristic for my composite filter include a center frequency which is optimally selected at 17 Hz. There is an extremely sharp skirt on the low frequency side. As depicted in FIG. 2, the infinite, or 75, db point is approximately at 4 to 5 Hz.

It is known that the pumping action of the heart creates a signal due to blood pulse flow which is between D.C. to 5 Hz in a wide variety of subjects. This signal has an extremely high energy content. Accordingly, it is essential that this frequency range be isolated and removed from the signal employed in my invention or it will mask the fundamental and render any readings taken useless. Although various theories have been advanced concerning the reason why tiny oscillations in addition to the main blood pulse frequency band of D.C. to 5 Hz exists, more scientific studies are needed to clearly establish a scientifically proved basis for this phenomenon. I have discovered, irrespective of the correct theory, that there is a fundamental frequency associated with arterial blood flow in the artery. It is this fundamental frequency signal which I detect in accordance with my invention. This fundamental frequency is a low frequency oscillation which is caused by the down stream blood flow resistance of a subject being tested. In my invention I make use of this discovery by selecting what I believe to be the fundamental frequency of this extremely low signal level oscillation. At the same I block entirely the frequency content of the main blood pulse.

Reference to FIG. 2 shows the extremely sharp skirt of my composite filter characteristic which cuts off all frequencies less than about 5 Hz. A center frequency of 17 Hz has proved optimum in the low frequency band pass filter of my invention. However, the center frequency for the filter characteristic of my composite filter may be selected anywhere from the range of approximately 7 to 27 Hz. Such a center frequency could possibly be even lower by a few Hz as technology develops even sharper filter skirts so as to block the low frequency range of the main blood pulse, i.e., frequencies less than about 5 Hz.

The signals picked up and after transducer 40 are amplified by filtering by a composite filter, in accordance with my invention, such signals are thereafter employed to drive a pen of a galvanometer by way of a pen drive mechanism 46 of any known type. Pen 47 makes an initial radial mark at the maximum inflation pressure, shown on disk 75, FIG. 1. Thereafter the pen holds a steady position for a short circumferential tracing, as the release of air pressure via drive 35 rotates disk 75 in the direction shown by arrow 49, until the systolic pressure is detected. The first spike or radial line 48 indicates the systolic pressure which is shown in FIG. 1 as approximately 125 millimeters of mercury. Thereafter a series of substantially uniform radial lines 48-57 appear on disk 75. As soon as those radial lines exhibit a distinct change in height, that first change is indicated as the diastolic pressure. The second or diastolic pressure is shown in FIG. 1 as approximately 70 millimeters of mercury.

Turning now to FIG. 3, a more detailed and block and circuit schematic diagram of the components of FIG. 1 is shown. In FIG. 3, an input lead from sensor 40 of FIG. 1 is first connected to a pre-amp stage 110 for providing an initial amplification of the signals detected emitted by sensor 40, FIG. 1. As was mentioned hereinbefore in connection with FIGS. 1 and 2, all components of my blood pressure measuring and recording system are taken into consideration in order to assure a composite filter of my desired characteristics. Such components which are considered include the filter characteristics of sensor 40, actual filter circuits and the galvanometer circuitry as well. The overall characteristics of my composite filter are a summation of these various filters. As shown in FIG. 3, three major sources of filter characteristics, in addition to that of sensor 40, exist in the system.

Filter 120, for example, is a notch filter with a notch at an infinite, or 30 db point of approximately 60 Hz. Connected to notch filter 120 is a twin-T-or active filter having a center frequency of approximately 9 Hz. All the filters together effectively remove frequency components from the signal applied by sensor 40 which are below approximately 5 Hz. Actually as shown in FIG. 2, the low frequency cut-off is between 4 to 5 Hz at 75 db.

The signal passed from the active filter 130 is next supplied to a follower amplifier 140. The amplified and filtered signal is thereafter applied to two separate gain adjustment circuits 150 and 160. These two separate gain adjustments provide necessary gain for a wide variety of subjects. The gain adjustments may be selected as controlled by an operator. Thus, if a person is in shock the gain adjustment stages 150 and 160 may be set at the highest possible value. On the other hand, if a person having a strong pulse is being monitored, the gain adjustment 150 and 160 are set at a much lower value. A medium setting at adjustments 150 and 160 is normally proper for most normally healthy subjects.

A suitably amplified signal in accordance with the foregoing description is applied, by an output lead from gain adjustment 160 to an amplifier stage 165. Connected to amplifier stage 165 is a driver stage 170. Driver stage 170 is connected, in turn, to a power amplifier 175 which supplies sufficient power to drive a galvanometer 180.

Galvanometer 180 may be any suitable galvanometer known in the art which includes an electrically pulsed stylus or pen 48. Because the galvanometer 180 includes coils 182, I provide capacitor 183 to form an additional filter 190 having an approximate characteristic as depicted in FIG. 3. All of the filter circuits taken together for sensor 40, and filters 120, 130 and 190 form my composite filter which exhibits the characteristics shown in FIG. 2 and described in detail earlier.

In FIG. 3 the various amplification stages are merely shown in block form because there are numerous devices available which are known to the prior art and which are suitable for use in the circuitry of my invention. Accordingly, complete circuit schematics for such devices are not necessary for a complete and full understanding of the operation of my invention.

In the specification certain terms have been employed which require further definition in order to avoid any possibility of ambiguity. For example, the word "infinite db point" as used in conjunction with the characteristic of my composite filter shown, for example in FIG. 2, means that a low frequency signal approximately DC to 5 Hz is blocked from passage into the system. In other words, its signal level is down by ratio of at least 10 to 1 as compared to the signal energy which is to be passed through my composite filter. Similarly, the pass band width of my composite filter characteristic on the upper side of the frequency scale need not be near as sharp in terms of roll off as is the case of the low frequency side. Basically, what is of significance in the pass band range of 7 to 35 Hz allows the fundamental frequency signal of my invention to be recovered and utilized.

While a preferred embodiment of the present invention has been described hereinabove, it is intended that all matter contained in the above description and shown in the accompanying drawings be interpreted as illustrative and not in a limiting sense. Further, all modifications, constructions and arrangements which fall within the scope and spirit of the invention may be made.

What is claimed is:

1. A system for detecting a subject's blood pressure wherein means are employed for momentarily occluding and slowly releasing the blood's flow in an artery which is accessible for indirect sensing, said system comprising:

transducing means for converting the arterial wall movement under the occluding means into an electrical signal which possess a fundamental sub-audible frequency that may be detected and used as an indication of the subject's blood pressure, said transducer means exhibiting a first filter characteristic;

indicating means connected to said occluding means and responsive to said filtered output signal for registering the subject's blood pressure, said indicating means exhibiting a second filter characteristic; and filter means connected to said transducer for isolating said fundamental frequency from other frequencies in the transducer output signal, said filter means when combined with the said first and second filter characteristics forming a composite filter characteristic having a center frequency, $f_c$, selected at about 17 Hz, a bandwidth of approximately 10 to 30 Hz measured at the 3 to 6 db points, and a sharp low frequency cut-off to essentially infinite db at about 5 Hz.

2. A system in accordance with claim 1 wherein said occluding means is a sleeve and the transducer means is located in said sleeve.

3. A system in accordance with claim 1 wherein said indicating means comprises means for registering the systolic and diastolic pressure of a subject in visible form.

4. A system in accordance with claim 3 wherein said indicating means comprises a pen drive galvanometer for making indications on a circular recording means.

5. A system for detecting a subject's blood pressure wherein means are employed for momentarily occluding and slowly releasing the blood's flow in an artery which is accessible for indirect sensing, said artery having a blood pulse present which creates a high energy composite signal in a frequency range of d.c. to about 5 Hz, said system having a transducer for converting the arterial wall movement into an electrical signal, and an indicating means connected to the occluding means and responsive to an electrical input signal for registering a subject's blood pressure, the improvement comprising:

said transducer exhibiting a first filter characteristic selected to emit an electrical signal which possess a fundamental sub-audible frequency that may be detected and used as an indication of the subject's blood pressure;

said indicating means exhibiting a second filter characteristic to pass an electrical signal indicative of a subject's blood pressure to be recorded; and means connected between the transducer and the indicating means, to form a combined filter characteristic therewith for blocking passage of the blood pulse signal and isolating the fundamental frequency from other frequencies in the transducer output signal, said combined filter characteristic characterized by:

a center frequency $f_c$ selected at about 17 Hz, a bandwidth of approximately 10 to 30 Hz measured at the 3 to 6 db points, and a sharp low frequency cut-off to essentially infinite db at about 5 to 7 Hz.

6. A system in accordance with claim 5 wherein said means connected between the transducer and the indicating means comprises a filter having a third filter characteristic combining with said first and second filter characteristics for forming therewith said combined filter characteristic.

* * * * *